US011881627B2

(12) United States Patent
Bennett et al.

(10) Patent No.: US 11,881,627 B2
(45) Date of Patent: Jan. 23, 2024

(54) RECONFIGURABLE, FLEXIBLE MULTI-USER ELECTRONICALLY STEERED ANTENNA (ESA) TERMINAL

(71) Applicant: LOCKHEED MARTIN CORPORATION, Bethesda, MD (US)

(72) Inventors: Jonathan James Bennett, Littleton, CO (US); Alan Cherrette, Littleton, CO (US); Andrew H. Kwon, Upland, CA (US); Elie Germain Tianang, Aurora, CO (US); Mark Adam Patrick, Littleton, CO (US); Paul A. Porter, Castle Pines, CO (US); Gregory Eric Edlund, Littleton, CO (US); Robert Mark Clark, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 385 days.

(21) Appl. No.: 17/086,045

(22) Filed: Oct. 30, 2020

(65) Prior Publication Data

US 2021/0288415 A1 Sep. 16, 2021

Related U.S. Application Data

(60) Provisional application No. 62/987,824, filed on Mar. 10, 2020.

(51) Int. Cl.
*H01Q 21/20* (2006.01)
*H04W 16/28* (2009.01)

(52) U.S. Cl.
CPC ............ *H01Q 21/20* (2013.01); *H04W 16/28* (2013.01)

(58) Field of Classification Search
CPC .... H01Q 21/20; H01Q 21/0006; H01Q 3/242; H01Q 25/00; H04W 16/28
USPC .......................................................... 342/373
See application file for complete search history.

(56) References Cited

U.S. PATENT DOCUMENTS

| | | | | |
|---|---|---|---|---|
| 5,650,788 A | * | 7/1997 | Jha ...................... | H01Q 21/065 343/702 |
| 10,897,303 B1 | * | 1/2021 | Ananth ................ | H04B 7/0617 |
| 2008/0045146 A1 | * | 2/2008 | Wahlberg ........... | H04B 7/18573 455/12.1 |
| 2012/0235858 A1 | * | 9/2012 | Dougherty ............ | G01S 7/4026 342/169 |
| 2015/0323659 A1 | * | 11/2015 | Mitchell ................. | G01S 13/02 342/41 |
| 2016/0105233 A1 | * | 4/2016 | Jalali ..................... | H04W 16/28 342/359 |

(Continued)

*Primary Examiner* — Syed Haider
(74) *Attorney, Agent, or Firm* — BAKERHOSTETLER

(57) ABSTRACT

A Reconfigurable, Flexible Multi-User (RFMU) electronically steered antenna (ESA) includes a top panel and a number of side panels that enable many contacts simultaneously with varying gain requirements from a single, in situ, installation. The top panel includes multiple subarrays and can communicate with flyover satellites, and the side panels can communicate with satellites flying past a side of the ESA. The top panel and the side panels can achieve a beam steering that covers a full or partial, variable gain, hemispheric field-of-view (FoV). The RFMU ESA terminal top and side panels are scalable using flexible modular building blocks. This enables increased contacts, increased gain or a combination thereof sized to meet desired performance.

20 Claims, 9 Drawing Sheets

(56) References Cited

U.S. PATENT DOCUMENTS

2019/0372233 A1* 12/2019 Stokes ............... H04B 7/18517
2021/0249767 A1*  8/2021 Greenwood ......... H01Q 21/061

* cited by examiner

RECONFIGURABLE, FLEXIBLE MULTI-USER ELECTRONICALLY STEERED ANTENNA (ESA) TERMINAL

CROSS-REFERENCES TO RELATED APPLICATIONS

This application claims priority to and the benefit of U.S. Provisional Patent Application No. 62/987,824, filed Mar. 10, 2020, which is hereby incorporated by reference in its entirety.

STATEMENT REGARDING FEDERALLY SPONSORED RESEARCH OR DEVELOPMENT

Not applicable.

FIELD OF THE INVENTION

The present invention generally relates to aerospace technology, more particularly to a reconfigurable, flexible multi-user (RFMU) electronically steered antenna (ESA) terminal.

BACKGROUND

With the advent of smaller and lower-cost spacecraft (e.g., microsatellites and nanosatellites) coming into use and the ability to launch these small spacecraft into low earth orbit (LEO) more cheaply, by ride sharing on a launch vehicle, more LEO satellite applications (e.g., remote sensing) are becoming economically viable. As a consequence, the number of LEO satellites in orbit is greatly increasing. These small LEO spacecrafts downlink their data in allocated S-band frequencies (2.20 GHz to 2.30 GHz) and X-band frequencies (7.75 GHz to 8.40 GHz). They also receive their commands in allocated S-band uplink frequencies (2.01 GHz to 2.12 GHz). There are also satellite systems using Ku and Ka links. Due to the small size and low power capabilities of these satellites, the downlink equivalent isotropically radiated power (EIRP) of these LEO satellites is limited (e.g., 3 dBW to 18 dBW).

Closing communications links to these low EIRP LEO spacecraft requires relatively large, gimballed reflector antennas (e.g., 3.7 m to 7.3 m aperture diameters or larger) on the ground. Since a space-ground link requires one reflector antenna on the ground per LEO spacecraft in view, there will be a need to increase the number of reflector antennas on the ground in proportion to the number of LEO satellites in orbit, to get the data from these satellites back to Earth. Currently, many LEO satellite operators have been installing their own ground gateway networks, which consist of a set of reflector antennas and the associated network connections (including backhaul links) devices, that allow their data to be routed to data centers for processing and storage (cloud services).

Due to line of sight issues, big reflector antennas require a lot of land to scan to low-elevation angles (e.g., 5 degrees). For example, placing ten 3.7 m reflector antennas in a plane so that each reflector antenna can scan to 5 degrees elevation in any azimuth direction requires ten acres of land (or one acre per 3.7 m reflector antenna). Larger reflector antennas require more area per antenna. The placement area goes up as the square of the antenna diameter. The requirement for a large amount of land to support multiple reflector antennas means reflector antennas are usually located far away from the data centers where the downlinked satellite data is processed and stored. To connect the reflector antennas to the data center requires fiber backhaul and the associated recurring expense. The multi-beam antenna of the subject technology can be located on a data center and perform the function of multiple reflector antennas without the associated acreage and backhaul costs. The disclosed RFMU ESA terminal for ground gateways solves the problem of making many contacts with existing large, gimballed reflector antennas and the design is applicable to the varying bands being used for up- and down-links across the many satellite systems being designed and launched.

The current method for solving this problem is to procure and install an increasing number of gimballed, parabolic dish terminals (3.7 m, 5.4 m, 7.3 m, etc.). A single gimballed, parabolic dish terminal is required for each expected contact, as well as the land required to maintain line-of-sight constraints. This roughly equates to land purchases of one acre of land per additional 3.7 m dish and even more for larger dish reflectors.

SUMMARY

According to various aspects of the subject technology, a reconfigurable, flexible multiuser (RFMU) electronically-steered antenna (ESA) terminal is disclosed that can be located on a data center and perform the function of multiple reflector antennas without the associated acreage and backhaul costs of the existing ground terminal antennas. The disclosed RFMU ESA terminal for ground gateways solves the problems associated with existing large, gimballed reflector antennas.

In one or more aspects, an ESA terminal includes a top panel and a number of side panels. The zenith facing top panel includes multiple subarrays and can communicate with flyover satellites, and the side panels can communicate with satellites flying past a side of the ESA terminal. The top panel and the side panels can achieve beam steering angles that cover a full hemispheric field-of-view (FoV), and the top panel and the side panels are scalable and flexibly modular.

In other aspects, a satellite antenna system includes an ESA terminal and associated back-end electronic circuitry to generate control and status signals, and to collect and process data generated by the ESA terminal. The ESA terminal consists of a top panel, including a number of subarrays and a cylindrical structure supporting multiple side subarrays. The electronic circuitry can enable the top panel and the side subarrays to achieve a beam steering that covers a full hemispheric FoV.

In other aspects, a satellite system includes one or more communication satellites and an ESA system that provides a dynamic communication link with the one or more communication satellites. The ESA system consists of a top panel, including a number of side subarrays, multiple side subarrays supported by a cylindrical structure, and electronic circuitry that can enable the top panel and the side subarrays to achieve a beam steering that covers a full hemispheric FoV.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
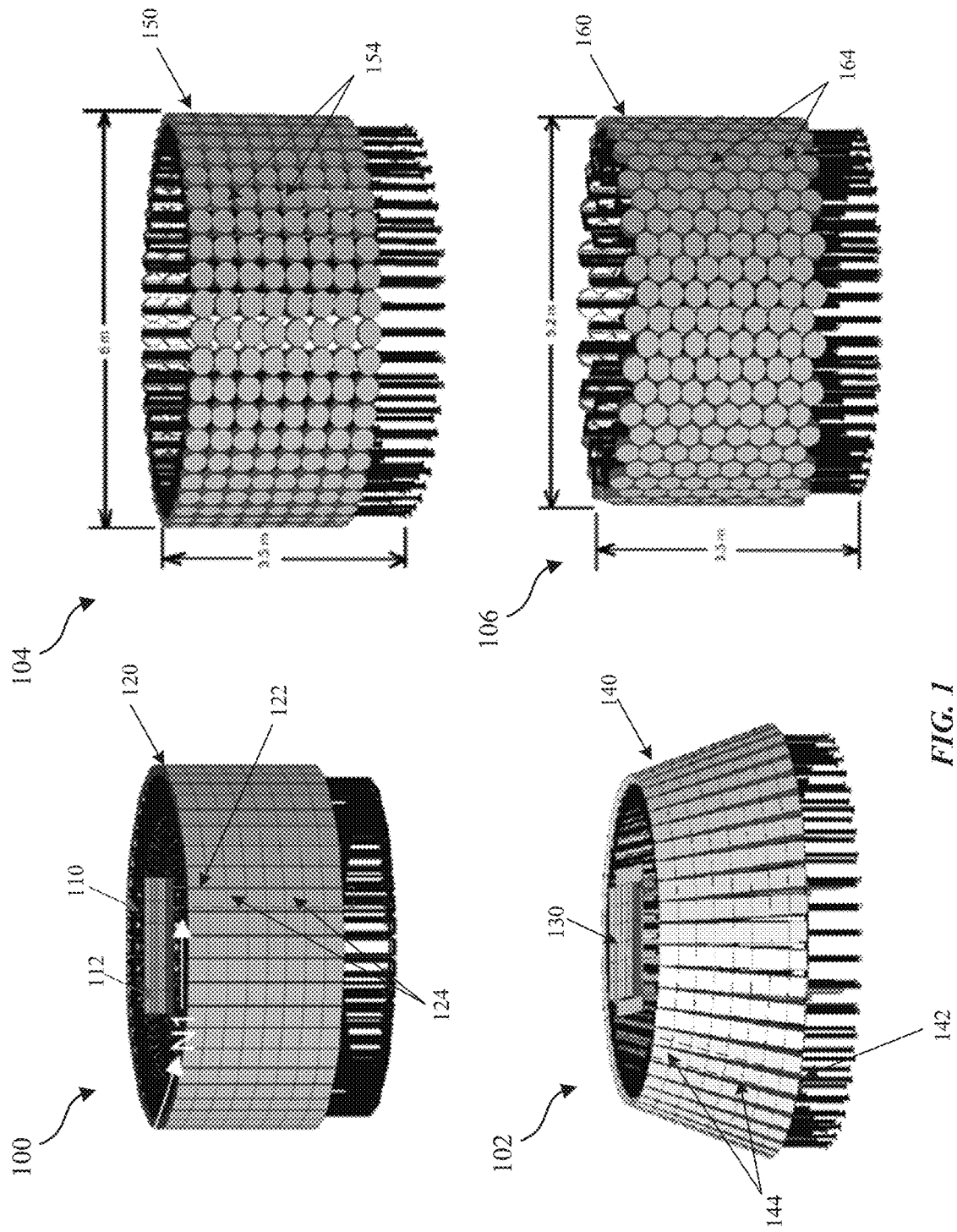
FIG. 1 is a set of diagrams illustrating examples of various structural configurations of a reconfigurable, flexible multi-user (RFMU) electronically steered antenna (ESA) terminal, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

According to various aspects of the subject technology, methods and configurations for providing multi-beam antennas are disclosed. The multi-beam antennas of the subject technology can be located on a data center and perform the functions of multiple reflector antennas without the associated acreage and backhaul costs of the existing ground terminal antennas. The RFMU ESA terminal of the subject technology is capable of supporting multiple contacts simultaneously in one relatively small footprint. It can be easily scaled and expanded to produce more contacts and higher performance as demand increases.

Currently, many LEO satellite operators have been installing their own ground gateway networks that consist of a set of reflector antennas and the associated network connections that allow their data to be routed to data centers for processing and storage (cloud services). This is not an efficient use of ground resources, because any given reflector antenna is not used 100% of the time by a single satellite operator.

In order to provide more efficient use of terrestrial reflector antennas, commercial gateway services that lease time on these reflector antennas are now becoming available. A satellite operator, in this case, can lease time on a commercial network of terrestrial reflector antennas and avoid the capital expense and upkeep expense of an underutilized, operator-owned ground gateway network. The problem with reflector antennas for this application is that one space-ground link requires one reflector antenna on the ground per LEO spacecraft in view. Therefore, large numbers of big reflector antennas (e.g., 3.7 m to 7.3 m aperture diameters) are needed to service the growing number of LEO spacecraft. This roughly equates to land purchases of one acre of land per additional 3.7 m dish antenna, and more for larger dishes.

The disclosed RFMU ESA terminal has no data backhaul requirement and no increasing land requirement. The RFMU ESA terminal is installed in situ at the customer site. Therefore, data is taken directly from the terminal and processed at the site. Furthermore, once the ESA terminal is installed, there are no additional, future land purchases required to scale up the system. The customer procures the ESA terminal to cover its expected user demand, and if that demand is exceeded in the future, then the ESA terminal is scaled in height and/or in number of columns (diameter) to meet the growing need. The parabolic antenna configuration requires one antenna to make one satellite contact, regardless of the EIRP of the satellite. The ESA has the capability to use any excess capacity to make additional contacts with other satellites.

The flexibility of the disclosed ESA terminal adapts to the dynamically changing RF environment and can immediately increase the number of contacts at lower required antenna gain-to-noise-temperature (G/T) over the base system, without the procurement of new parabolic dish antennas and needed acreage, resulting in immediate revenue opportunities. The ESA terminal architecture of the subject technology is based on an analysis determining the most advantageous elevation angles and improving the performance of the ESA when the beam approaches the edge or corner of a panel and transitions to the next panel, providing G/T aligned to market needs. Based on a review of most designs and architectures currently being explored in the market today, it is clear that the disclosed ESA terminal can significantly drive down cost per beam, increase capability across simultaneous contacts and elevation angles, scale across various G/T equivalencies and, potentially, reduce power consumption with some modification of the shape of the antenna.

The disclosed vertical (i.e., non-tilted) cylindrical design of the ESA terminal provides multiple full gain beams across a selected G/T at elevation angles of 5 degrees to 15 degrees, where approximately 50% of available contact minutes exist, increasing the revenue possibilities. This is configurable if users only appear at higher elevation, leading to tilted cylindrical designs. The disclosed ESA terminal can be fielded at the user site with a smaller physical footprint than a comparable set of parabolic antennas, individual single-beam, or tri-beam phased array antenna systems. For example, the ESA terminal can be placed on the ground, at a ground stand-off, on the roof of a building or on a ship. Furthermore, being located in situ at the data center eliminates data backhaul costs and reduces the total cost of ownership with respect to a comparable parabolic dish farm.

FIG. 1 is a schematic diagram illustrating examples of various structural configurations 100, 102, 104 and 106 of a reconfigurable, flexible multi-user (RFMU) electronically steered antenna (ESA) terminal, according to certain aspects of the disclosure. In the structural configuration 100, the RFMU ESA terminal 120 is a cylindrical terminal including a top panel 110 and a number N of columns 122 formed around a right circular cylinder. The top panel 110 includes a number of subarrays 112, and each column 122 includes multiple subarrays 124. Each subarray 112 or 124 may include several (e.g., about 220 to 270 for X-band) antenna-feed elements that, in the case of structural configuration 100, are rectangular-shaped elements. In one or more aspects, each subarray 112 may include a lens (for increased or optimized steering) and may or may not be the same type of subarray used in the side panels.

In the structural configuration 102, the RFMU ESA terminal 140 is a conical terminal, including a top panel 130 and a number N of columns 142 formed around a conical, circular cylinder. The top panel 130 includes a number of subarrays, and each column 142 includes multiple subarrays 144, which are similar to the subarrays of the structural configuration 100 (rectangular-shaped). In this example, the individual columns are tilted relative to the axis of the cylinder.

The structural configuration 104 shows an RFMU ESA terminal 150 that is a cylindrical terminal similar to the RFMU ESA terminal 120 of the structural configuration 100, except that the zenith panel has been removed and the subarrays 154 have elliptical shapes rather than being rectangular-shaped. The structural configuration 104 is shown to have a diameter of about 6 m and a height of about 3.5 m, which are exemplary width and height values for an X-band configuration and are not intended to be limiting. All terminal configurations are fully scalable.

The structural configuration 106 shows an RFMU ESA terminal 160 that is a cylindrical terminal similar to the RFMU ESA terminal 150 of the structural configuration 104, except that the subarrays 164 have elliptical shape in an offset pattern rather than having rectangular or polygonal (e.g., hexagonal) shapes and, accordingly, are arranged differently. The structural configuration 106 is shown to have a diameter of about 5.2 m and a height of about 3.5 m, which are exemplary width and height values for an X-band configuration and are not intended to be limiting.

In general, the structural configuration of the RFMU ESA terminal is not limited to the structural configurations 100, 102, 104 and 106 of FIG. 1. For example, the tilt angle of the conical, circular cylinder of structural configuration 102 can be any practical angle that is optimized for a particular application, the top panel could be configured tilted like 140 or flat like 130 or combination thereof, and the subarray shapes are not limited to square, circular or hexagonal and can be, for instance, elliptical, triangular or trapezoidal as well. Further, the structural configurations of the RFMU ESA terminal of the subject technology can include different mechanical assemblies and structures.

Figure 2:
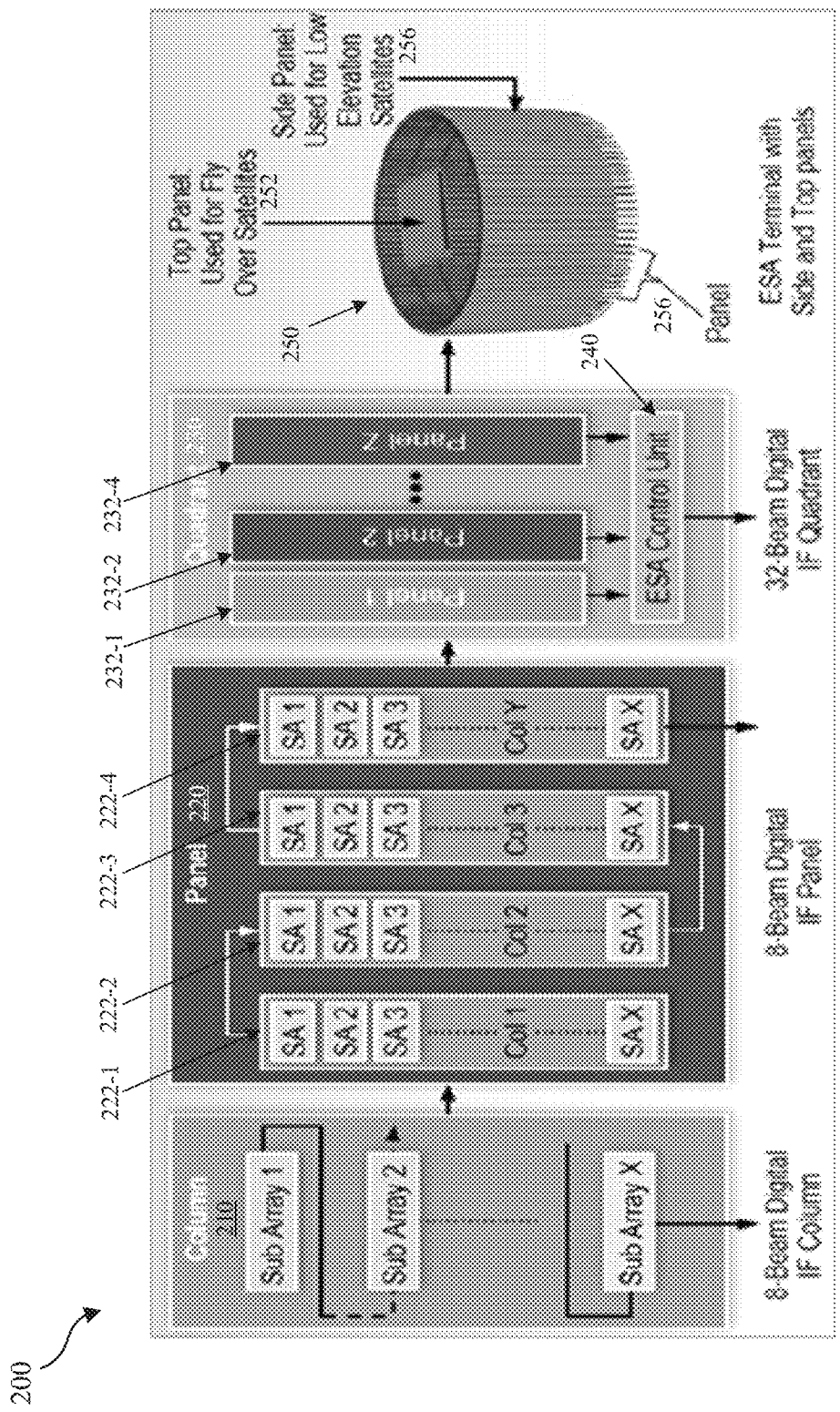
FIG. 2 is a schematic diagram illustrating an example of a radio frequency (RF) and electrical configuration of an RFMU ESA terminal, according to certain aspects of the disclosure.

FIG. 2 is a schematic diagram illustrating an example of a radio frequency (RF) and electrical configuration 200 of an RFMU ESA terminal, according to certain aspects of the disclosure. In the RF and electrical configuration 200, a number of subarrays 1 through X (e.g., 8) of a column 210 are serially coupled to form an 8-beam digital intermediate frequency (IF) column. A panel 220 is formed by multiple (e.g., 4) columns 222-1, 222-2, 222-3 and 222-4 (hereinafter, columns 222), which are serially coupled. The panel 220 can be an 8-beam digital IF panel. A number of (e.g., 4) panels 232-1, 232-2 . . . 232-4 (hereinafter, panels 232) can form a quadrant 230 with the panels 232 coupled in parallel to an ESA control unit 240. In some respects, the RF and electrical configuration of the subarrays of an RFMU ESA terminal can be quite flexible and are not limited to the schemes of FIG. 2. This includes the ability to digitally combine in parallel at any level down to the subarray to enable increased total usable beams to increase the total number of contacts.

The column 210, the panel 220 and the quadrant 230 can correspond to an RFMU ESA terminal 250 with a top panel 252 and side panels 256, where the top panel 252 is used for flyover satellites and the side panels 256 are used for low-elevation satellites.

Figure 3:
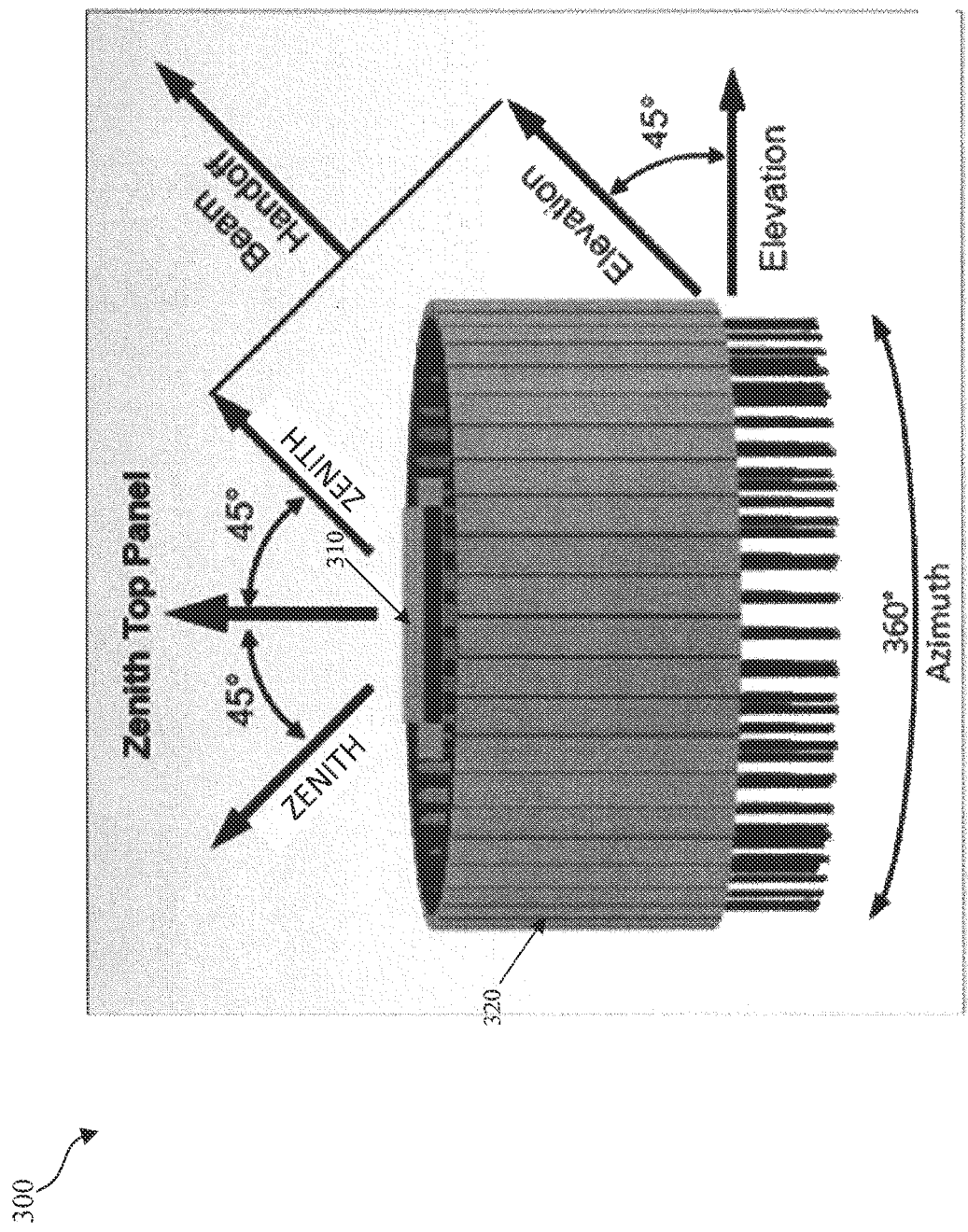
FIG. 3 is a schematic diagram illustrating an example of a beam handoff from the side to top panels of an RFMU ESA terminal, according to certain aspects of the disclosure.

FIG. 3 is a schematic diagram illustrating an example of a beam handoff from side to side panels and/or side to top panel of an RFMU ESA terminal 300, according to certain aspects of the disclosure. The RFMU ESA terminal 300 is similar to the RFMU ESA terminal 100 of FIG. 1 and includes a top panel 310 and side panels 320, which are capable of covering 360 degrees of azimuthal angles and zero degrees to 90 degrees of elevation angles. As shown in FIG. 3, the top panel 310 can be used to cover flyover satellites that appear at any azimuthal angle (between zero and 360 degrees) in between elevation angles of about 45 degrees and 90 degrees from horizontal. A handover from the top panel 310 to a number of side panels 320 can happen when the satellite flies to lower-elevation angles between about 5 degrees and 45 degrees at any azimuthal angle (between zero and 360 degrees). The numerical values specified for elevation angles are exemplary values and are not intended to be limiting.

Figure 4:
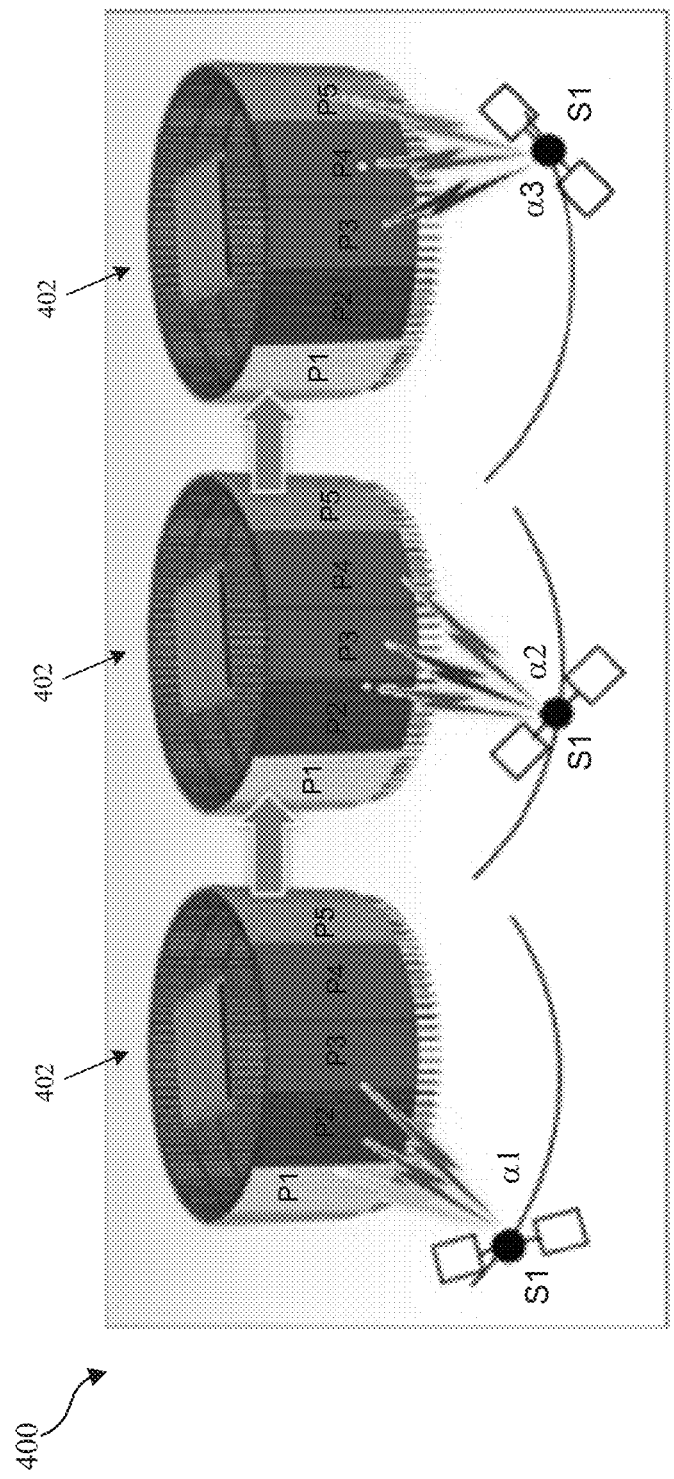
FIG. 4 is a schematic diagram illustrating an example of a beam handoff across side panels of an RFMU ESA terminal during an interval of a satellite traveling time, according to certain aspects of the disclosure.

FIG. 4 is a schematic diagram illustrating an example of side panel beam handoffs scheme 400 of an RFMU ESA terminal 402 during an interval of a satellite traveling time, according to certain aspects of the disclosure. In the beam handoff scheme 400, a satellite S1 is flying in low elevation angles (e.g., between zero degrees and 45 degrees) around an RFMU ESA terminal 402 and can connect dynamically with multiple (e.g., three) neighboring panels of the side panels. At a first position denoted by the azimuthal angle $\alpha 1$, the satellite S1 communicates with the RFMU ESA terminal 402 via a number of (e.g., three) beams linking the satellite S1 to panels P1, P2 and P3 of the RFMU ESA terminal 402. As the satellite moves, at a second position denoted by the azimuthal angle $\alpha 2$, the communication of the satellite S1 with the RFMU ESA terminal 402 is handed off to panels P2, P3 and P4 of the RFMU ESA terminal 402. Further, at a third position denoted by the azimuthal angle $\alpha 3$, the communication of the satellite S1 with the RFMU ESA terminal 402 is handed off to panels P3, P4 and P5 of the RFMU ESA terminal 402. The numerical values specified for elevation angles are exemplary values and are not intended to be limiting.

Figure 5A:
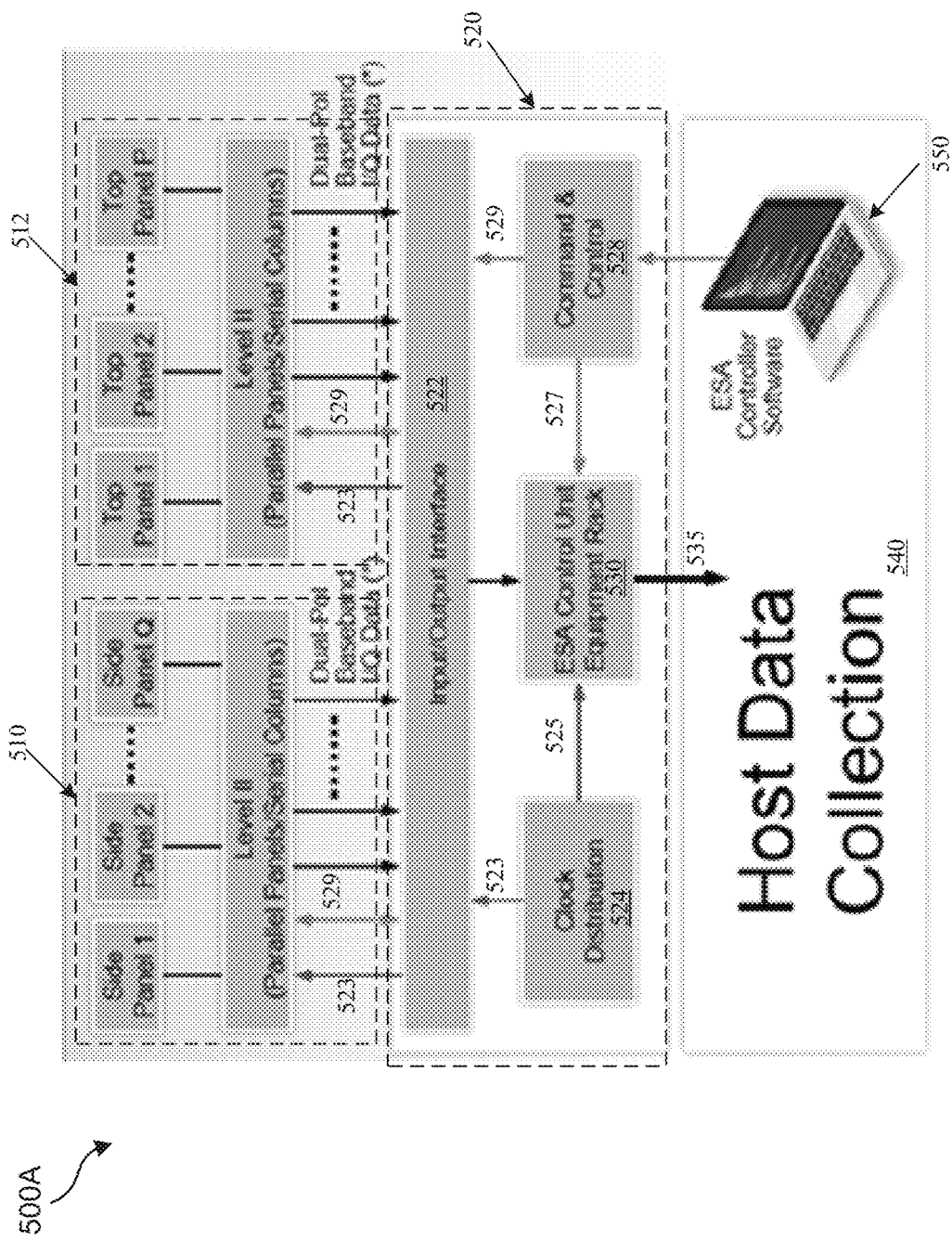
FIGS. 5A and 5B are schematic diagrams illustrating examples of data collection schemes for an RFMU ESA terminal, according to certain aspects of the disclosure.
Figure 5B:
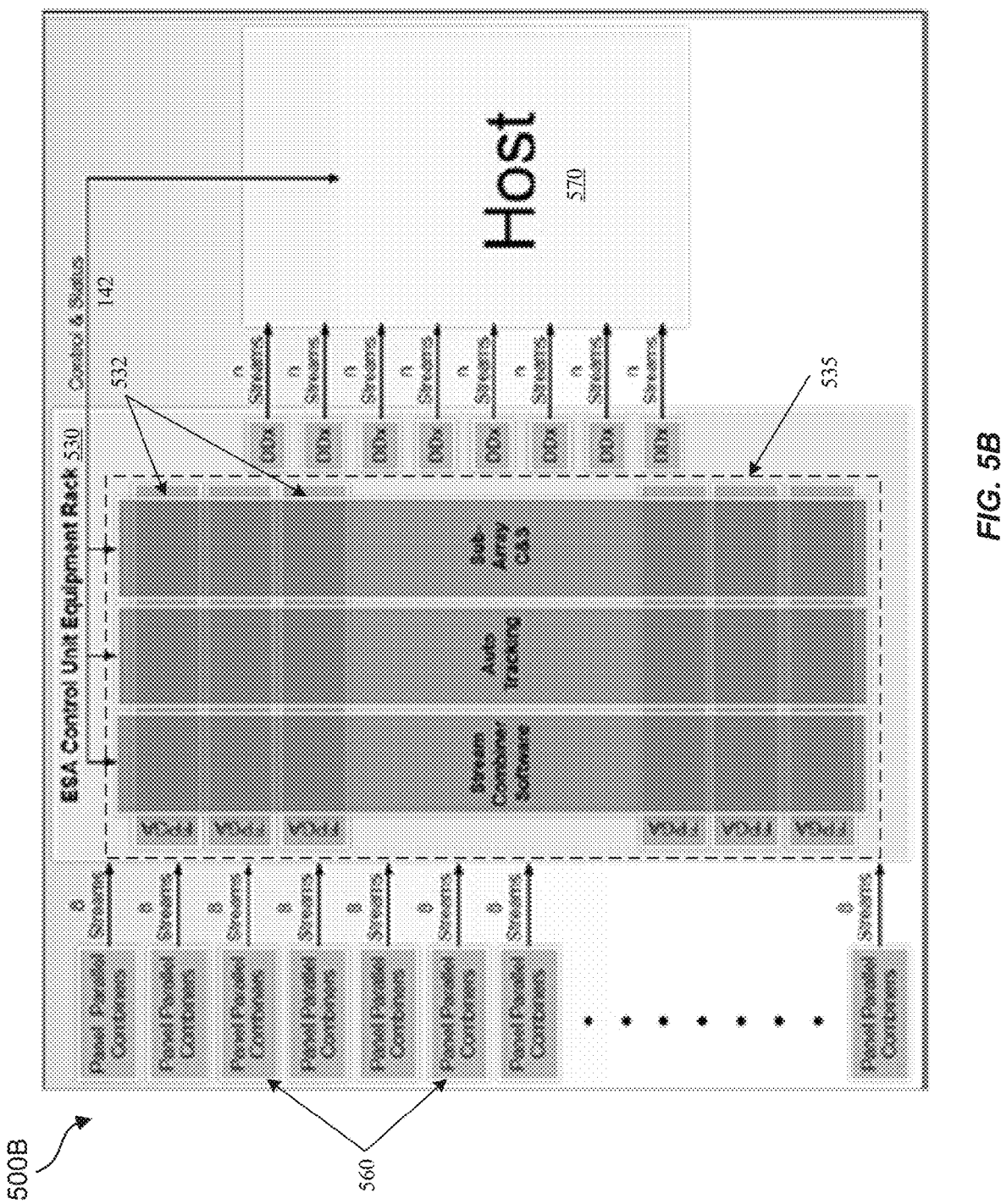

FIGS. 5A and 5B are schematic diagrams illustrating examples of data collection implementations 500A and 500B for an RFMU ESA terminal, according to certain aspects of the disclosure. In the data collection implementation 500A, panel blocks 510 and 512 work with data collection and control block 520 to provide host data 535 for a host data collection block 540. The panel block 510 includes side panels 1 through Q, the data from which are combined at a first level II block into serial columns (e.g., 210 of FIG. 2) and parallel panels (e.g., 230 of FIG. 2). Similarly, the panel block 512 includes top panels 1 through P, the data from which are combined at a second level II block into serial columns (e.g., 210 of FIG. 2) and parallel panels (e.g., 230 of FIG. 2). The data from the first and second level II blocks are dual-polarization (dual-circular or dual-linear polarization) baseband in phase (I) and quadrature (Q) data and are passed to the data collection and control block 520. There is also a configuration where native dual linear polarization is used to create dual circular polarization digitally at this level; making a quad polarization system possible supporting more satellite user types. The data collection and control block 520 includes an input/output (I/O) interface 522, a clock distribution unit 524, an ESA control unit equipment rack 530 and a command and control unit 528. The clock distribution unit 524 generates suitable clock signals 523 and 525 that are transmitted through the I/O interface 522 to the first and second level II blocks, as well as to the ESA control unit equipment rack 530, respectively. The command and control unit 528 receives command signals from a computer 550, which includes an ESA controller software, and distributes command signals 527 and 529 to the ESA control unit equipment rack 530 and through the I/O interface 522 to the first and second level II blocks, respectively. The ESA control unit equipment rack 530 receives data from the I/O interface 522 in a synchronous manner and forwards the collected data to the host data collection system 540 which can include a computer 550. The computer 550 can represent a cloud server.

The data collection implementation 500B includes panel parallel combiners comprised of a devices or circuitry such as field-programmable gate arrays (FPGA), application-specific integrated circuits (ASIC) and/or advanced reduced instruction set computer (RISC) machines (i.e., ARM) processors 560, FPGA control circuitry 532 and the host processor 570. Each of the panel parallel combiners 560 (e.g., 230 of FIG. 2) combines data from a number of (e.g., four) panels to generate multiple (e.g., eight) data streams. The streams from each panel parallel combiner 560 is passed to an FPGA 532 of the FPGA circuitry 535, which includes stream combiner software, auto tracking and subarray control and status (C&S) units together with a number of data driver circuits (DDx), form the ESA control unit equipment rack 530. The FPGA circuitry 535 receives from and transmits to the host 570 control and status signals 142. The processed data from the FPGA circuitry 535 is passed to the host 570 through a number (n) of streams from each of the data driver circuits. The data collection implementations 500A and 500B indicate that for the RFMU ESA terminals of the subject technology, combining may be achieved at varying levels, for example, at subarray, column, panel and system level with unlimited variations of combinations.

Figure 6:
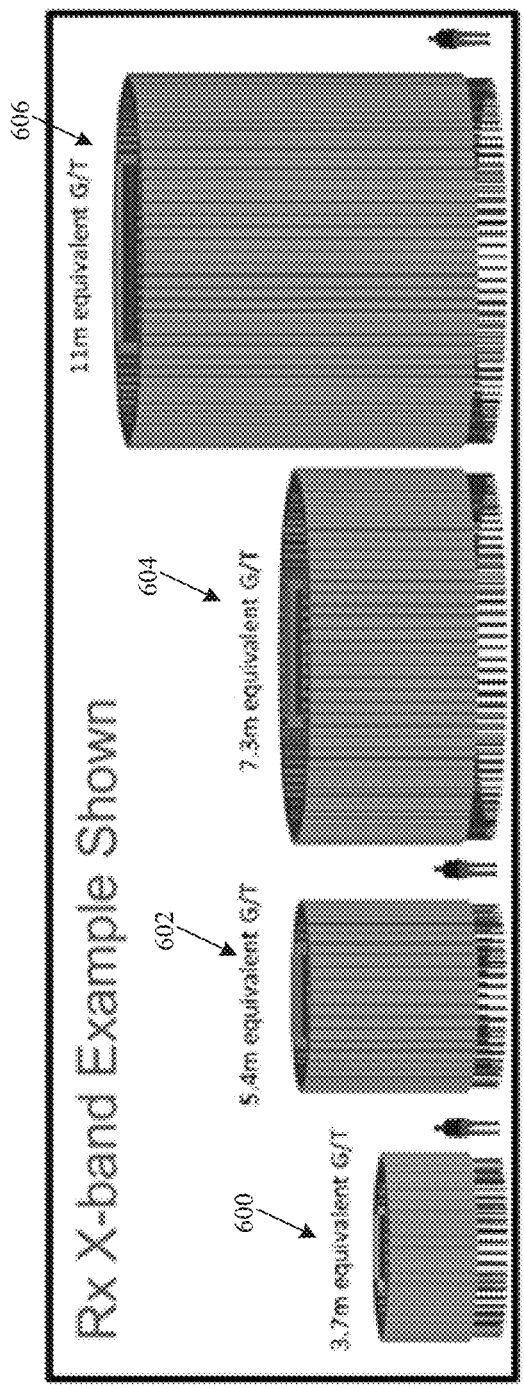
FIG. 6 is a schematic diagram illustrating examples of RFMU ESA terminals with exemplary dish-equivalent gain values for a receive X-band, according to certain aspects of the disclosure.

FIG. 6 is a schematic diagram illustrating examples of RFMU ESA terminals 600, 602, 604 and 606 with exemplary dish-equivalent gain values in a receive X-band, according to certain aspects of the disclosure. The ESA terminal 600 has a size of 3.7 m equivalent G/T, which indicates that ESA terminal 600 has the same G/T as a dish antenna with a diameter of 3.7 m. The ESA terminal 602 is taller than the ESA terminals 600, but has the same width and features 5.4 m dish equivalent G/T. The ESA terminal 604 has the same height as the ESA terminal 602, but has a larger diameter and features 7.3 m dish equivalent G/T. Finally, the ESA terminal 606 has the same diameter as the ESA terminal 604, but has a larger height and features 11 m dish equivalent G/T. A person has been added for FIG. 6 to show rough scale. It should be noted that the intent of this design is that a user may procure a smaller sized terminal to meet current needs and then expand on that procured terminal by adding columns in height and/or diameter with a relatively small reconfiguration change.

Figure 7:
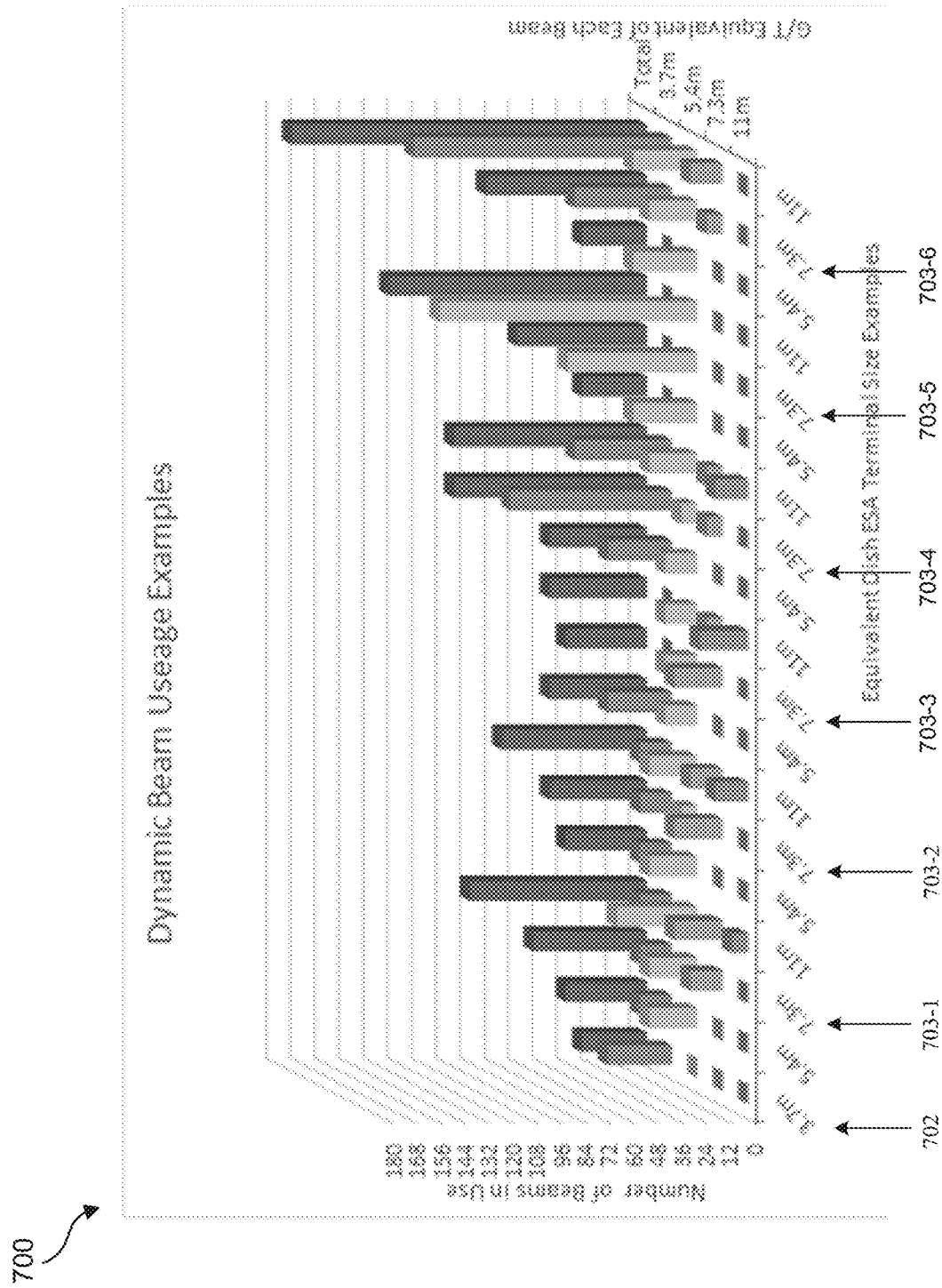
FIG. 7 is a chart illustrating examples of the available dynamic nature of various RFMU ESA terminal equivalent sizes with an example number of beams and the gain of each beam, according to certain aspects of the disclosure.

FIG. 7 is a chart 700 illustrating examples of various RFMU ESA terminal equivalent sizes with example number of beams and gain of each beam, according to certain aspects of the disclosure. The chart 700 represents an example beam usage configuration of the disclosed RFMU ESA terminal that allows a number of beams for an ESA of a particular dimension to be configured based on other ESAs with different dimensions. The chart 700 shows the number of beams in use in terms of the equivalent dish ESA terminal size. The five rows of data correspond to 11 m, 7.3 m, 5.4 m and 3.7 m dish size equivalent and a total value, respectively. The dish size equivalents (3.7 m, 5.4 m, 7.3 m and 11 m) correspond to the RFMU ESA terminals 600, 602, 604 and 606 of FIG. 6, respectively. The data in the chart 700 shows how the number of beams in use for a specific equivalent dish size can change when the same is achieved with different combinations of the RFMU ESA terminals 600, 602, 604 and 606. For example, for a 3.7 m equivalent dish size (X-axis) (702), 32 (Y-axis) full gain 3.7 dish equivalent (Z-axis) beams can be formed, whereas for a 7.3 m equivalent dish size (X-axis) a number of combinations (703-1 through 703-6) are possible. For instance, the combination 703-5 indicates that a 7.3 m equivalent dish size terminal can be used to achieve a total number of 60 5.4 m dish equivalents beams. Similarly, the 7.3 m equivalent dish size terminals can be used to create any combination of beams up to the 7.3 m equivalent gain (703-1 through 703-4 and 703-6). All are examples and are not intended to be limiting.

Figure 8:
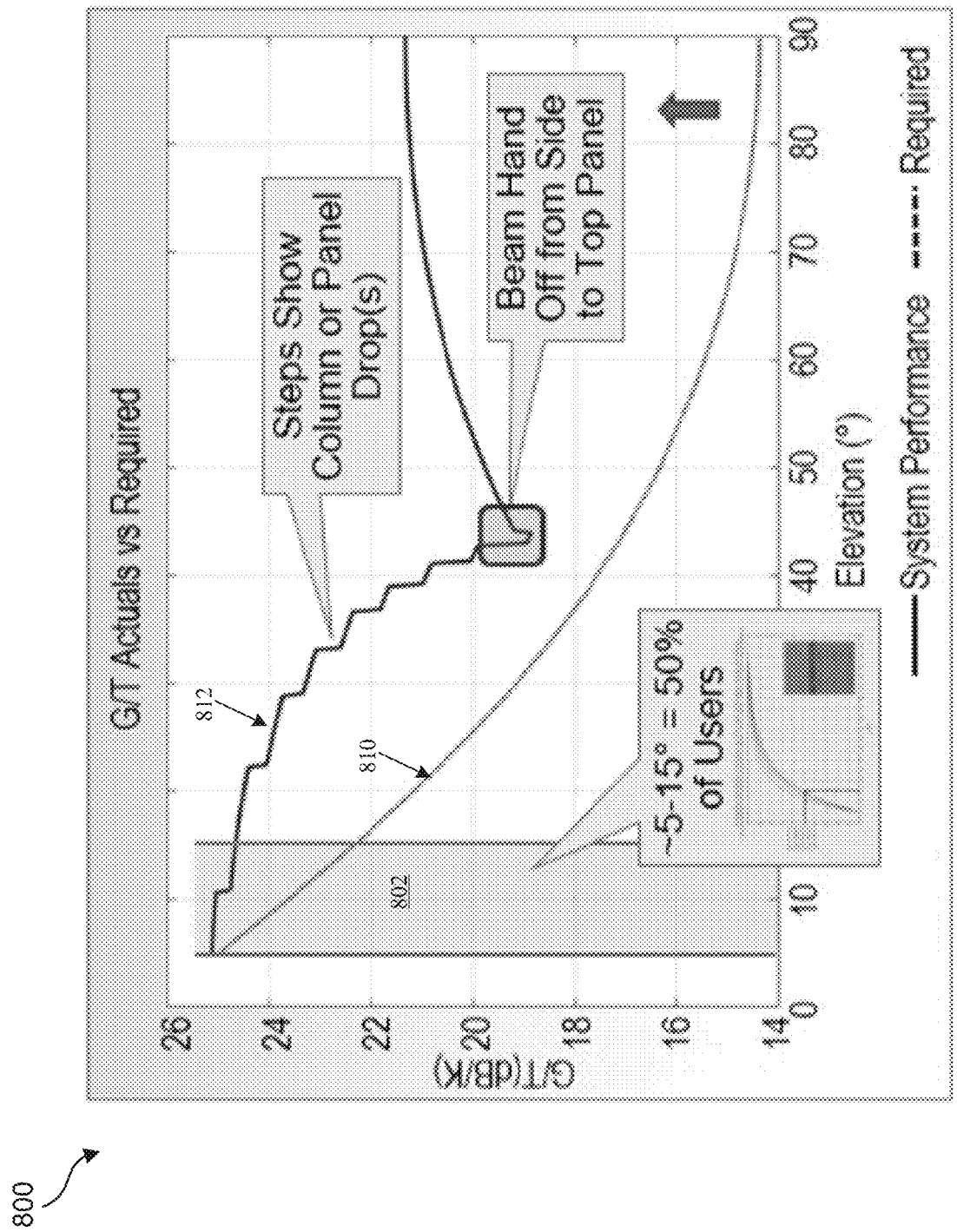
FIG. 8 is a chart illustrating an example of gain values with beam hand offs for an RFMU ESA, according to certain aspects of the disclosure.

FIG. 8 is a chart 800 illustrating gain values for an RFMU ESA terminal, according to certain aspects of the disclosure. The chart 800 includes an area 802 and plots 810 and 812. The area 802 covers elevation angles between about 5 degrees and 15 degrees. The area 802 shows the range of elevation angles in which 50% of the satellites are located, which would use the non-tilted terminals of type 100, 104 and 106 that are optimized to a 5 degree elevation angle. The plotted curve 810 shows the required gain (G/T) in terms of dB/K versus elevation angle. The system performance is depicted by the actual G/T of an exemplary RFMU ESA terminal of the subject technology, which is shown by the plot 812. As can be seen, the 5 degree elevation angle, or lowest required elevation angle, drives the terminal size. The steps in the plot 812 can be attributed to column or panel drops and the dramatic change in slope at about 45 degrees elevation angle is due to beam hand off from the side panels (e.g., 320 of FIG. 3) to the top panel (e.g., 310 of FIG. 3).

In some aspects, the subject technology is related to satellite communication and, more particularly, to an RFMU ESA terminal. In some aspects, the subject technology may be used in various markets, including, for example, and without limitation, the sensor technology, communication systems and signal-processing markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may or may not be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patents or other documents that may be incorporated herein by reference, the definition that is consistent with this specification should be adopted.

What is claimed is:

1. An electronically steered antenna (ESA) terminal, the ESA terminal comprising:
   a top block panel comprising a plurality of top panels, wherein each top panel comprises a plurality of series-connected top-columns, wherein each top-column comprises a first plurality of series-connected subarrays, wherein the top block panel is configured to communicate with one or more satellites at a first elevation angle; and
   a plurality of side panels configured to communicate with the one or more satellites at a second elevation angle, wherein each side panel comprises a plurality of series-connected side-columns, and wherein each side-column comprises a second plurality of series-connected subarrays, wherein:
   the top block panel and the plurality of side panels are configured to perform beam steering that covers a full or partial hemispheric field-of-view (FoV) using beams formed across the plurality of top panels and the plurality of side panels by transitioning to different beams between different panels across the plurality of side panels and the top block panel, and
   the plurality of top panels and the plurality of side panels are scalable and flexibly modular.

2. The ESA terminal of claim 1, further comprising a cylinder structure, wherein the top block panel and the plurality of side panels are coupled to the cylinder structure, and wherein the top block panel is configured to communicate with flyover satellites flying at elevation angles within a range of 45 degrees to 90 degrees and up to 360 degrees of azimuthal angles.

3. The ESA terminal of claim 1, wherein the plurality of side panels is configured to communicate with satellites at elevation angles within a range of zero degrees to 45 degrees and up to 360 degrees of azimuthal angles, wherein communicating with the satellites comprises transmitting to and/or receiving from the satellites.

4. The ESA terminal of claim 1, wherein a subarray of the second plurality of series-connected subarrays has an elliptical shape.

5. The ESA terminal of claim 1, wherein at least one subarray of the first plurality of series-connected subarrays or the second plurality of series-connected subarrays has a polygonal shape, wherein the polygonal shape includes a rectangular shape, a square shape and a hexagonal shape.

6. The ESA terminal of claim 1, wherein at least one subarray of the first plurality of series-connected subarrays or the second plurality of series-connected subarrays has a circular shape.

7. The ESA terminal of claim 1, further comprising a cylindrical structure, wherein the plurality of side panels is mounted on the cylindrical structure, wherein the cylindrical structure includes a partially-closed cylinder.

8. The ESA terminal of claim 7, wherein the cylindrical structure comprises a right circular cylindrical structure.

9. The ESA terminal of claim 7, wherein the cylindrical structure comprises a conical cylindrical structure.

10. The ESA terminal of claim 1, wherein the plurality of side panels is configured to provide a dynamic beam in S-band frequencies.

11. The ESA terminal of claim 1, wherein the plurality of side panels is configured to allow a flying satellite to dynamically communicate via a combination of multiple beams of multiple neighboring panels of the plurality of side panels.

12. A satellite antenna system, comprising:
   an electronically-steered antenna (ESA) terminal configured to communicate with a satellite, the ESA terminal comprising:
   a top panel including a plurality of series-connected top-columns, wherein each top-column comprises a first plurality of series-connected subarrays, and a cylindrical structure supporting a plurality of side panels, wherein each one of the plurality of side panels comprising a plurality of series-connected side-columns, and wherein each side-column comprises a second plurality of series-connected subarrays; and an electronic circuitry configured to generate control and status signals and to collect and process data generated by the ESA terminal, the electronic circuitry being further configured to enable the top panel and the plurality of side panels to perform beam steering that covers a full or partial hemispheric field-of-view (FoV) using beams formed across the plurality of series-connected side-columns by combining different beams of different panels across the plurality of side panels and the top panel.

13. The satellite antenna system of claim 12, wherein each side panel of the plurality of side panels is connected to other panels of the plurality of side panels in parallel.

14. The satellite antenna system of claim 12, wherein the electronic circuitry comprises a plurality of panel parallel combiners that are configured to combine data from two or more panels of a combination of the top panel and the plurality of side panels, an ESA control unit comprising multiple integrated circuits, and a host processor.

15. The satellite antenna system of claim 14, wherein the multiple integrated circuits are configured to:
combine data streams generated by the plurality of panel parallel combiners for processing by the host processor,
perform auto tracking functionalities, and
communicate status and control signals with the host processor.

16. The satellite antenna system of claim 12, wherein the top panel is configured to communicate with flyover satellites at elevation angles within a range of 45 degrees to 90 degrees and up to 360 degrees of azimuthal angles.

17. The satellite antenna system of claim 12, wherein the plurality of side panels is configured to communicate with satellites at elevation angles within a range of zero degrees to 45 degrees and up to 360 degrees of azimuthal angles.

18. The satellite antenna system of claim 12, wherein the cylindrical structure comprises one of a right circular cylindrical structure or a conical cylindrical structure.

19. An electronically-steered antenna (ESA) ground terminal that supports a satellite system with one or more communication satellites, the ESA ground terminal comprising:
a top panel comprising a plurality of series-connected top-columns, wherein each top-column comprises a first plurality of series-connected subarrays;
a plurality of side panels supported by a cylindrical structure, wherein each of the plurality of side panels comprising a plurality of series-connected side-columns, wherein each side-column comprises a second plurality of series-connected subarrays; and
electronic circuitry configured to enable the top panel and the plurality of side panels to perform beam steering that covers a full hemispheric field-of-view (FoV) using beams formed across the top panel and the series-connected side-columns of two or more neighboring side panels, wherein the two or more neighboring side panels of the plurality of side panels are configured to transition around the cylindrical structure to cover the FoV.

20. The ESA ground terminal of claim 19, wherein:
the top panel is configured to connect with the one or more communication satellites at elevation angles within a range of 45 degrees to 90 degrees and up to 360 degrees of azimuthal angles,
the plurality of side panels is configured to connect with the one or more communication satellites at elevation angles within a range of zero degrees to 45 degrees and up to 360 degrees of azimuthal angles, and
the ESA ground terminal is configured to communicate with the one or more communication satellites by way of a dynamic communication link that comprises one or more dynamic transmission links or one or more dynamic reception links.

* * * * *